United States Patent [19]

Sauer

[11] 4,295,811
[45] Oct. 20, 1981

[54] APPARATUS FOR MAKING MULTILAYERED CONTAINERS

[75] Inventor: Donald G. Sauer, Harwinton, Conn.

[73] Assignee: National Can Corporation, Chicago, Ill.

[21] Appl. No.: 58,781

[22] Filed: Jul. 19, 1979

Related U.S. Application Data

[60] Continuation-in-part of Ser. No. 608,177, Aug. 27, 1975, which is a division of Ser. No. 448,191, Mar. 5, 1974, abandoned.

[51] Int. Cl.$^3$ ............................................. B29C 17/07
[52] U.S. Cl. .................................... 425/112; 264/511; 264/513; 264/538; 425/126 R; 425/129 R; 425/523; 425/533
[58] Field of Search ............... 425/112, 125, 126 R, 425/129 R, 523, 533, 534, 538, 155, 156, 163; 264/511, 513, 537, 538

[56] References Cited

U.S. PATENT DOCUMENTS

| | | | |
|---|---|---|---|
| 3,122,598 | 2/1964 | Berger | 264/247 |
| 3,170,970 | 2/1965 | Adams | 264/537 |
| 3,247,550 | 4/1966 | Haines, Jr. | 264/511 X |
| 3,342,914 | 9/1967 | Edwards | 264/549 |
| 3,717,544 | 2/1973 | Valyi | 264/511 X |
| 3,787,157 | 1/1974 | Valyi | 425/112 |
| 3,947,205 | 3/1976 | Edwards | 425/388 X |

FOREIGN PATENT DOCUMENTS

| 684611 | 12/1952 | United Kingdom | 425/533 |
|---|---|---|---|
| 1325336 | 8/1973 | United Kingdom | |

*Primary Examiner*—Jan H. Silbaugh
*Attorney, Agent, or Firm*—Robert A. Stenzel; John W. Klooster

[57] ABSTRACT

Improved apparatus for forming multilayered thermoplastic articles employing a blow slot equipped, porous metal section equipped core rod. In addition to control means, the apparatus employs means for opening and closing the blow slot of the core rod, detachable connection means for connecting an internal fluid passageway in said core rod with a vacuum source, and other detachable connection means for connecting such internal fluid passageway with a pressurized fluid source. In addition, check valve means is provided for closing said internal fluid passageway when the internal fluid passageway is detached from the detachable connection means joining such with a vacuum source. The vacuum source is connectable with the core rod at the time of liner loading and the pressurized fluid source is connected with the core rod at the time of blow molding.

5 Claims, 12 Drawing Figures

APPARATUS FOR MAKING MULTILAYERED CONTAINERS

RELATED APPLICATION

This application is a continuation-in-part of my earlier filed U.S. application Ser. No. 608,177 filed Aug. 27, 1975 which in turn is a divisional application of my prior U.S. application Ser. No. 448,191 filed Mar. 5, 1974, now abandoned.

BACKGROUND OF THE INVENTION

Various techniques for molding hollow plastic articles and containers are known in the prior art. By one of these techniques, multiwalled containers may be produced by an injection blow molding procedure. Such a container may, for example, incorporate an inner wall or layer comprised of a thermoplastic resin having barrier properties (e.g. as respects water vapor or carbon dioxide transmission) and an outer wall or layer comprised of a thermoplastic resin having structural properties. In accordance with one such technique, a preformed liner of thermoplastic material which can, for example, be comprised of two or more layers or walls of differing thermoplastic resins is positioned over a core rod. The core rod is then positioned in the cavity of an injection molding zone and an injectable heated thermoplastic resin is injected into such cavity to form a composite preform or parison wherein the liner comprises the inner wall portion thereof. The composite preform on the core rod is removed from such injection mold cavity and is positioned next in the cavity of a blow molding zone. Fluid pressure is exerted on the preform between the preform and the core rod to an extent sufficient to make the preform expand into contact with adjacent wall portions defining the blow mold cavity which results in the production of a blown container. The blown container is removed from the blow mold cavity and the blown container is then separated from the core rod.

In endeavoring to practice such one technique at commercially acceptable rates so as to produce commercially acceptable product containers, problems have been experienced because of a tendency for the liner to experience creasing during formation of the preform apparently due to a variety of factors many of which appear to be associated with orientation and/or liner size variations in relation to an adjacent core rod. In practice such creasing tendency results in a significant percentage of product containers being formed of sub-standard quality.

Because of price and cost considerations, it is necessary for commercial purposes to have little or no rejects in a plastic manufacturing operation. Hence, in order to produce by such one technique high quality containers at commercial rates with few rejects, it is necessary to have an improvement in the practice of such one technique.

BRIEF SUMMARY OF THE INVENTION

By the present invention, there is provided improved apparatus for injection blow molding. The apparatus employs a plurality of blow slot equipped core rod assemblies each of which incorporates a porous metal section in the head portion thereof. In addition, the apparatus incorporates conduit means for pressurizing selectively at various stages of apparatus operation internal portions of each core rod assembly present at such operative machine stages, the pressurizing involved either the use of fluids at super atmospheric pressure or the use of fluids at sub-atmospheric pressures depending upon which particular stage of machine operation is involved.

More specifically, the apparatus of the present invention involves a core rod assembly such as above characterized wherein pressure inside the rod is reduced below atmospheric at the time when a liner is mounted over head portions of the rod. Thereafter, the apparatus is equipped with means for maintaining the internal portions of the core rod at reduced pressures relative to atmospheric during a subsequent injection molding operation wherein a layer of thermoplastic material is deposited over and around exterior surface portions of the liner thus mounted on the core rod. Thereafter, the apparatus of the present invention permits one to transfer the core rod to a blowing station where sub-atmospheric pressures are changed to super-atmospheric pressures, thus causing the composite structure upon the core rod to expand into a fully blown article of manufacture within a blow mold.

An object of the present invention is to provide an improved injection blow molding apparatus wherein one can produce at reasonably short a cycle times commercially acceptable multilayered containers.

Another object is to provide injection molding apparatus wherein the problems experienced in the prior art for liner creasing and other liner and preform defects are substantially completely eliminated through the use of selective sub-atmospheric pressurization of core rod interiors.

Another object of the present invention is to provide an improved rotary type injection blow molding apparatus wherein at a liner loading station the core rods can be maintained at reduced pressures which are maintainable through the next or injection molding station and further wherein at the next further succeeding station, that is the blow molding station, the same core rods through essentially the same channels can be pressurized with a pressurized fluid in order to produce blown containers.

Other objects, aims, purposes, features, uses, advantages and the like will become apparent to those skilled in the art from the following detailed description taken with the accompanying drawing.

DETAILED DESCRIPTION

Figure 1:
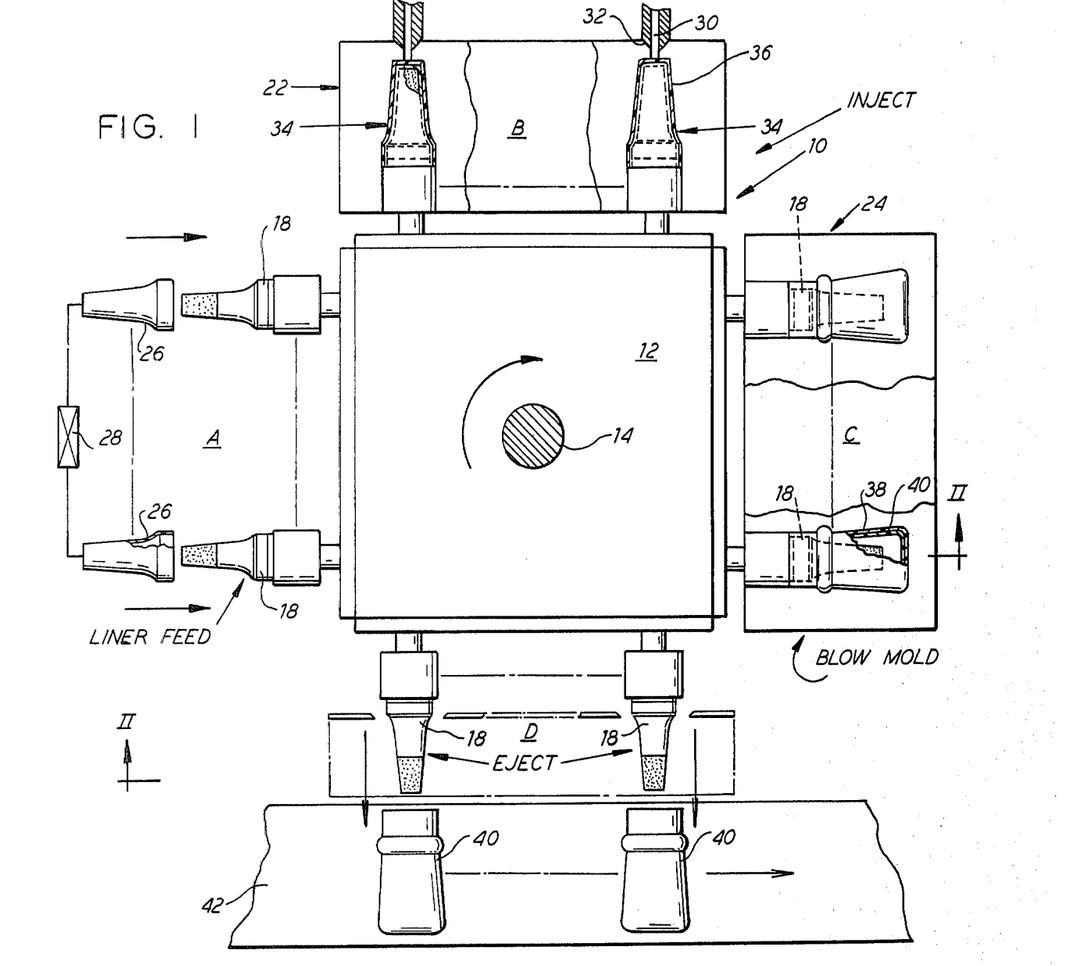
FIG. 1 is a schematic top view, partially in section, of a four stage rotary injection blow molding machine illustrating the field of use for a core rod assembly of the present invention.
Figure 2:
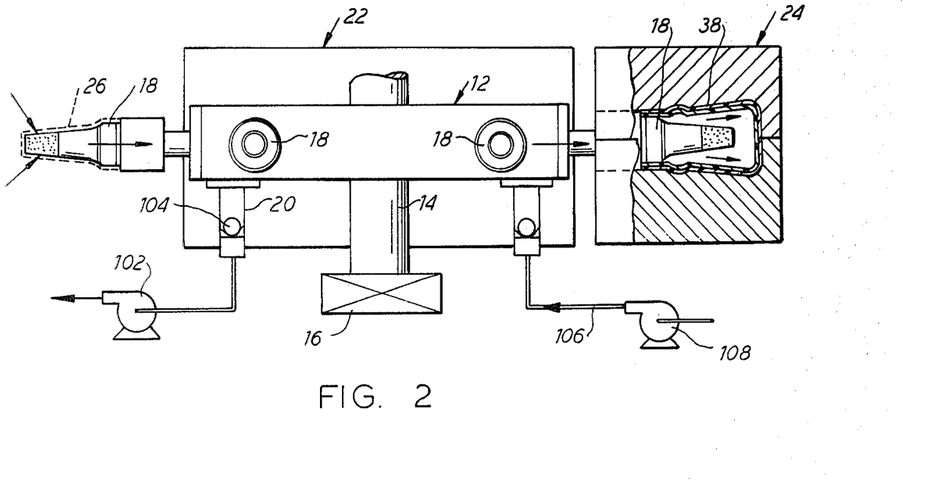
FIG. 2 is a schematic vertical sectional view of the rotary injection blow machine of FIG. 1 taken along the line II—II thereof.

Illustrated in FIGS. 1 and 2, for example, is a schematic presentation of one embodiment of a four stage rotary injection blow molding machine 10 into which a plurality of the core rod assemblies of the present invention may be incorporated. The rotary injection blow molding machine 10 incorporates a square shaped (or sided) indexing platen (or turret) 12 mounted on a shaft 14 which is equipped with a Ferguson drive 16 having a clutch brake and timing assembly. The drive assembly 16 and the machine 10 are provided with the usual and conventional instrumentation, timing circuits, safety features, and the like for automatic and continuous operation of the machine 10. The machine 10 is provided with four operational stations, i.e., a liner feed station A, a preform injection station B, a blow molding station C, and a product removal station D. Each side of the platen or turret 12 is provided with an equal plurality of core rods 18 which are functionally interconnected with fluid conduits 20. Optionally, the platen 12 can be fitted with intermediate heat transfer conduit (not shown) for core rod 18 temperature control. Preform injection station B is provided with split injection molds 22, and blow molding station C is provided with split blow molds 24. The molds 22 and 24 are provided with intermediate heat transfer conduits (not shown) as are known to those skilled in the art.

In operation, the platen 12 is set to rotate intermittently through 90° per cycle of indexing at a setable time interval dependent on such variables, for example, as injection time, blow time, molded part removal, and the like.

At the liner feed station A, individual liners 26 from a liner magazine and feeder assembly 28 are positioned over one set of respective individual core rods 18. Thereafter, the split molds 22 and 24 are fully opened and the platen or turret 12 is raised by means of a vertical movement of a vertically displaceable machine platen (not shown). The platen 12 is then caused to rotate through 90° by the drive 16, thereby to move the liner equipped core rods 18 to station B. Generally, the lower portion of the molds 22 and 24 are immoveably positioned, and the associated respective mating upper portions thereof are mounted to the vertically displaceable machine platen (not shown). After completion of a 90° indexing step, the platen or turret 12 is caused to descend by the vertically displaceable machine platen (not shown) while concurrently the upper halves of the molds 22 and 24 are caused to close about the respective core rods 18.

At injection station B, a hot injectable plastic material 30 is injected through the injection nozzles 32 about the liner covered core rods to form composite preforms 34 within molds 22, the plastic being injected in the space between each individual liner 26 and the adjacent respective cavity wall surfaces 36 of the individual injection molds 22.

Thereafter, the split molds 22 and 24 are again fully opened, and the platen or turret 12 is again raised by the machine platen (not shown) and another 90° rotational indexing step of turret 12 is undertaken. After completion of such indexing step, the platen 12 and the mold halves 22 and 24 are permitted to descend to an operational position by the vertically displaceable machine platen (not shown). Thus, the individual composite preforms 34 are positioned within the respective blow molds C. A pressurized fluid, typically compressed air, is introduced into conduit 20 and discharged through blow slots (not shown in FIGS. 1 and 2) of the individual core rods 18 to cause the individual composite preforms to be expanded and to assume the shape of the overlying cavity surfaces 38 of the blow molds 24, thereby forming composite multiwalled blow molded containers 40.

Thereafter, through the action of the vertically displaceable machine platen (not shown) the split molds 22 and 24 are again fully opened, and the platen 12 is again raised. Machine platen 12 now indexes another 90° which brings the thus blown containers to the product removal station D. After the vertically displaceable machine platen is again lowered (closing the split molds 22 and 24 and bringing the platen 12 into an operative position), the containers 40 are removed typically by a mechanical means and the containers 40 are allowed to drop onto a conveyor assembly 42 or the like for conventional subsequent inspection, filling, packaging and the like (not shown). Those skilled in the art will appreciate that the above-described sequence of operations for one set of core rods is also experienced by each of the other three sets of core rods on respective other sides of the turret 12. Such an operational sequence is typical of the stages of operation of a four stage rotary injection blow molding machine.

Figure 3:
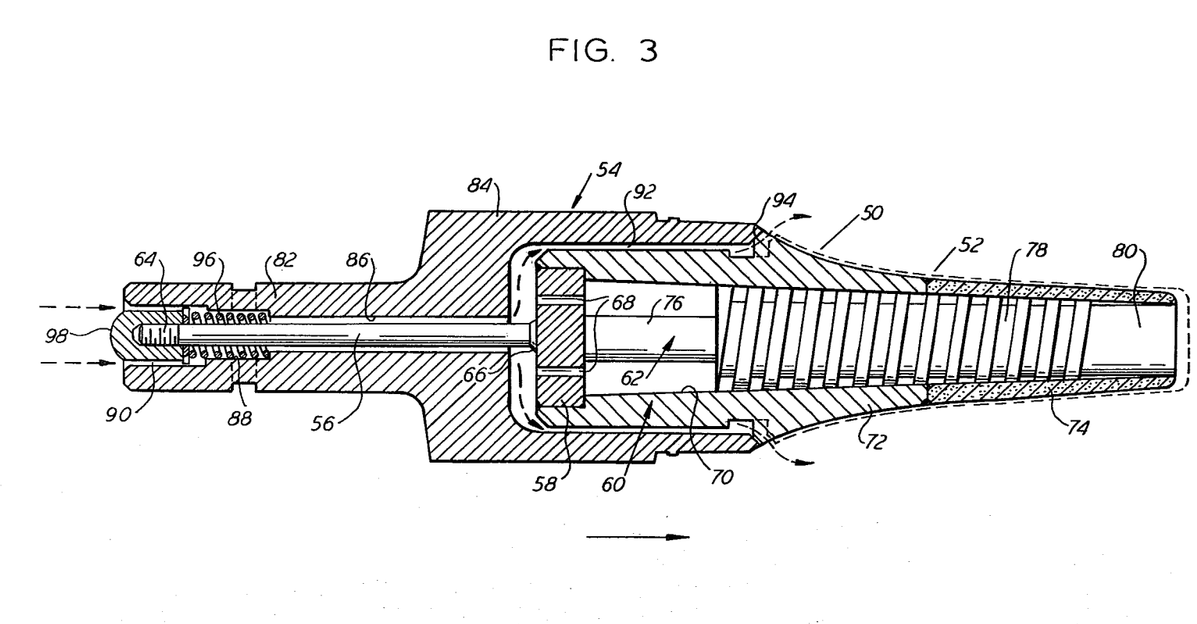
FIG. 3 is a detail-type longitudinal cross-sectional view through one embodiment of a porous core rod assembly of the present invention.

Referring now to FIG. 3, there is seen illustrated one embodiment of a core rod assembly 50 of this invention having a head member 52 and a body member 54. The head member 52 incorporates a rod member 56, a disc-shaped base member 58, a tubularly-shaped core pin (or rod) member 60, and a core pin (or rod) support member 62. The rod member 56 is threaded at 1 and 64 thereof and is centrally affixed at its other end 66 to base member 58. Orifices 68 are provided through base member 58 which has cylindrical, peripheral or circumferencial outerwall portions.

The tubularly-shaped core pin member 60 is formed with tapered innerwall surfaces 70 which converge with increasing distances from base member 58. Member 60 is mounted on base member 58 and extends coaxially with, but in a direction opposite from, the rod member 56.

The core pin member 60 has two sections, a base portion 72 of a solid material, such as hardened tool or stainless steel, and a forward face portion or section 74 formed of a porous material (i.e., one having a multiplicity of discreet passages formed therein during fabrication thereof), such as, for example, a two (2) micron porous stainless steel, or the like, with the base portion 72 being mounted about the circumference of base member 58, and with the face portion 74 being secured to the base portion 72, all by any convenient means, such as press fitting, brazing, or the like. The core pin support member 62 is generally and preferably formed of a material exhibiting excellent heat transfer properties, such as copper, copper alloy, or the like. Support member 62 has a base section 76 which is centrally secured, as by brazing or the like, to the base member 58 in a co-axially alignment with the rod member 56, a helically-shaped or surfaced intermediate section 78, and an end section 80. The threaded or helically flanged portion of the intermediate section 78 is formed with cylindrically extending flattened land portions which are arranged to be in intimate contact with mating tapered innerwall surface portions 70 of the core pin member 60. The end section 80 of support member 62 is coterminous with the end face of portion or section 74 of the core pin member 60.

The body member 54 is comprised of a cylindrically-shaped stem portion 82 and a cylindrically-shaped sleeve portion 84. Body member 54 is formed with a centrally disposed cylindrical passageway 86. The end section of the stem portion 82 opposite the sleeve portion 84 is provided with counterboard orifices 88 and 90, orifice 88 being deeper and having a smaller diameter than in the case of orifice 90. The sleeve portion 84 is formed with a cylindrical chamber 92 which is co-axial with passageway 86 and chamber 92 has a countersunk shouldered portion 94. The rod 56 of the head member 52 is extended through the passageway 86. A nut 98 is rotatably mounted on the threaded end portion 64 of the rod member 56, and is spaced apart from the inner shoulder wall surface of the counterboard orifice 90 when head member 52 is fully nested in body member 54 in the configuration shown by the solid lines in FIG. 3. A spring 96 is compressed between the shouldered surface 94 of the body member 54 and the rim edge of nut 98 in the cavity 88 so as to yieldingly bias head member 52 in a fully nested engagement with the body member 54 (as shown in FIG. 3 by solid lines). The spacial relationship between the rod 56 and the orifices 90 and 98 with the passageway 56 together with the spacial relationship between the outer surface of the base portion 72 of the core pin member 60 and the inner surface forming the chamber 92 forms a passageway or a channel for a fluid expanding medium (such as a gas like air) charged to the core rod assembly 50 through the orifice 90.

The head member 52 is caused to move axially forwardly relative to the body member 54 in the direction indicated by the arrow A in FIG. 3 by a mechanical means (not shown) associated with the platen 12 and applied generally axially against the nut 98. When this means is applied, head member 52 becomes moved to a location illustrated by the dotted lines shown in FIG. 3 at which location a compression fluid can pass through the assembly 50 from orifice 90 and out from the annular space defined between such respective head and body members 52 and 54. Removal of the application of such mechanical means from nut 98 causes the head member 52 to retract into the body member 52 by the effect of the compressive force of the spring 96 against the nut 98 threadably mounted on the rod member 56.

Additionally, as a result of the orifices (not detailed) in the porous metal of the face portion or section 74 of the head member 52 being present, a gaseous medium can pass through such porous face portion or section 74.

The core rod assemblies 50 can be utilized in the four stage rotary injection blowing machine by using the core rod assemblies 50 in the machine 10 in place of the core rods 18 with the machine 10 being modified as herein described.

In operation, after a starting warm-up period, operational cycling of the machine 10 is initiated. As an indexing step is completed bringing a set of core rods 50 into station A, the upset means (not shown) in turret 12 engages, and functions to move the head member 52 of each core rod 50 into the dotted line position shown in FIG. 3 thereby providing an aperture between body member 54 and head member 52 in the region of shoulder 94 for fluid passage therethrough to/from orifice 90 via chamber 22 and passage 86. A fluid passageway is also provided through section or portion 70 of porous metal, through the intermediate section 78, through the orifices 68, through the passage 86 and finally to orifice 90, or vice versa.

Also, as an indexing step is completed bringing a set of core rods 50 into station A, the liner magazine and feeder assembly 28 is brought into operation so that a liner 26 is positioned from each core rod 50 of the set thereof at station A. Because of the reduced pressure in the individual core rods 50, the liner 26 is brought into intimate face to face engagement with circumferential surface portions of respective core rods 50 and such liners 26 are held against the rods 50. At the initiation of the next subsequent indexing step a check valve 104 associated with conduit 20 is closed thereby maintaining subatmospheric pressures in conduit 20 and the individual core rods 50. This pressure is maintained throughout the entire next processing steps carried out at station B upon the core rods 50 thus provided with liners 26.

Alternatively, instead of conduit 20 being placed in fluid communication with line 100 by means of low pressures associated with the suction side of a pump 102 which operates continuously, the line 100 may be associated with an accumulator vessel (not shown) which itself is held at low pressures by an intermittently operating vacuum pump (not shown) whose operation is regulated by functionally associated pressure switches and the like.

After the platen or turret 12 has been raised, indexed, and lowered with the liner-covered, vacuumized core rods 50 being duly positioned in respective injection molds 22 located at injection station B, hot plastic 30 is injected through injection nozzles 32 over the individual liners 26 between the contured cavity surfaces 36 of the injection molds 22 to form a plurality of composite preforms 34. Typically, from about 4 to 10 such preforms 34 may be simultaneously formed by a single set of core rods located in one side of platen 12. Generally, liners 26 are temperature conditioned on their respective associated core rods 50 for a given time period prior to being exteriorally contacted by a layer of hot injected thermoplastic resin at station B.

As will be understood from the preceding description herein, simultaneously with the injection operation occurring at station B, a liner loading operation is occurring at station A with other liners 26 and another set of core rods 50 located along an adjacent side of turret 12.

When turret 12 next undergoes its indexing sequence through another segment of machine cycle, the composite preforms 34 are transferred from station B to station C within the respective individual blow molds 24 located in station C with the preforms 34 now being at an overall generally uniform temperature as desired for expansion (blowing). As the conduit 20 associated with the preform 34 equipped core rods 50 comes into position at station C, it is placed in fluid communication by line 26 with the discharge side of a fluid pressure pumpt 108 associated with line 106. A mechanical disabling means (not shown) disengages check valve 104 from its closed position, which changes pressure inside each core rod to atmospheric. Also, the upset means (not shown) in turret 12 engages and functions to move again the head member 52 of each core rod 50 into the dotted line position shown in FIG. 3, thereby providing again the aperture between body member 54 and head member 52 in the region of shoulder 94 for fluid passage therethrough here from orifice 90 via chamber 22 and passage 86. The fluid passageway from orifice 90 to porous metal section 70 is also open. A pressurized fluid (e.g., compressed air or other gas) is thus permitted to flow through the passageway 58 of each curved rod 50 and to exit between head member 52 and body member 54 thereof thereby permitting the composite preforms 34 to expand and move against the contured cavity surfaces 38 of each associated blow mold 24 and thereby form a plurality of containers 40, one on each core rod 50.

Thereafter, another segment of machine cycle is initiated, the platen 12 is caused to raise index and then lower at the product removal station D where the thus formed containers 40 are ejected by a mechanical means or the like onto a conveyor 42 for subsequent processing operations (not shown), such as inspection, filling and packaging. It is to be understood that since each one of the four sides of the platen or turret 12 is provided with a similar set of core rods 50, each core rod set is in a different operational step or segment of one complete machine cycle at any given time.

As herein above indicated, use of a porous metal core rod 50 of the present invention in a machine which is modified to permit the application of a vacuum within such core rods 50 during liner placement permits such vacuum to be applied during liner placement on core rods, to be maintained during injection molding at preform 34 formation and to be released before blowing. The vacuum holds the liners and prevents air pocket formation between a core rod 50 and a liner 26. By this arrangement, liner creasing may be substantially completely eliminated and product blown container defects are minimizable or completely eliminated. Another advantage of a core rod 50 of this invention is that it can make a fit between a liner and a core rod less critical than in the prior art so far as the production of commercial quality blown containers is concerned. Also, liner dimensional tolerances in relation to a core rod size are not as critical when making multiwalled containers by injection blow molding when using a core rod 50 which can be a significant cost saving feature from the standpoint of liner production.

Another feature is that the internal configuration of a core rod 50 allows for the introduction and passage of a conditioning fluid, if desired, therethrough, such as hot air or other hot gaseous fluid during a start-up of a machine 10 and its blow molding assembly. Also, a conditioning fluid can advantageously be fed through a core rod 50 after product container removal therefrom, and before implacement thereon of a liner during a production cycle, if desired.

The uniform passage of a conditioning fluid, such as compressed air or the like, through the porous face portion or section 74 of a core pin member 72, in a core rod 50, is enhanced by the helically extending thread-like ribs thereof, including the flat crests on the intermediate section 78 of the support member 72. Such a set of helically extending threads apparently enhances the even and uniform exiting of a conditioning fluid through the surface portions of section 74 owing to the nature of porous metal. However, it will be understood that while the intermediate section 78 is here formed with a helically extending thread section or portion the intermediate section 78 of a support member 62 may take other shapes, such as a star-shape support member in axially alignment with a core pin member having flat axially and radially extending flat crests which contact an inner wall surface 70 of a core pin member 60. The flat crests of threaded intermediate portion 78 is presently preferred in order to provide a significant area of contact so as to enhance support for the core pin member 60 as well as to enhance conductive heat transfer from a tip section of core pin member 60 to the interior portion of the core pin support member 62.

As hereinabove indicated, the support member 62 is preferably formed of a heat conductive material, such as copper or the like, to provide for the appropriate removal of heat, especially from the end portion 80 of the core pins 50, since the tip or end portion 80 thereof is normally subjected to higher temperatures as a result of the positioning of the hot plastic injection nozzles 32, that is, generally opposite such end portion during the injection portion of a machine cyle. Consequently, in a preferred configuration, porous metal is not formed over the tip of the end portion 80. As hereinabove discussed, a core pin assembly 50 is associated functionally with the platen 12 and may be provided with suitable conduits for the passage of cooled or heated intermediate heat transfer medium therethrough to maintain desired temperature levels for core rods (together with other potential conditioning requirements).

As will be appreciated by one skilled in the art, the base portion 72 of the core pin member 60 is formed of tool steel or stainless steel to provide for a stronger contacting surface between the core pin head member 52 and the body member 54 at the surface 94 thereby substantially lengthening the useable life span of such a core rod 50 as distinguished from the use of a core pin member 60 formed entirely of such porous metal. It will be understood by those skilled in the art that the optimized relative positioning of a blow slot in a core rod of this invention will vary depending on the plastic composition of the composite preforms involved in any given use situation as well as upon machine operating conditions. For instance, for polystyrene, the blow slot can be positioned as generally illustrated in FIG. 3, whereas for polyolefin, the blow slot can be generally located near a tip of a blow core.

Additionally, while the present novel core rod assembly has been disclosed with reference to a rotary injection blow molding apparatus having a plurality of blow cores disposed along each side of the platen or turret thereof, it will be understood and appreciated that the core rod assembly may be used in any process and apparatus for injection blow molding of articles (containers), such as a linear transfer injection blow molding apparatus utilizing a single core rod, or the like.

It will be further appreciated that a core rod fabricated of a porous metal may be used as the male member of a molding dye in a vacuum thermoforming process and apparatus to form the liner to be subsequently used in the hereinabove discussed process and apparatus for forming barrier containers.

In operation, after a starting warm-up period, operational cycling of the machine 10 is initiated. As an indexing step is completed bringing a set of core rods 50 into station A, the upset means (not shown) in turret 12 engages, and functions to move the head member 52 of each core rod 50 into the dotted line position shown in FIG. 3 thereby providing an aperture between body member 54 and head member 52 in the region of shoulder 94 for fluid passage therethrough to/from orifice 90 via chamber 22 and passage 86. A fluid passageway is also provided through section or portion 70 of porous metal, through the intermediate section 78, through the orifices 68, through the passage 86 and finally to orifice 90, or vice versa.

Also, as an indexing step is completed bringing a set of core rods 50 into station A, the liner magazine and feeder assembly 28 is brought into operation so that a liner 26 is positioned from each core rod 50 of the set thereof at station A. Because of the reduced pressure in the individual core rods 50, the liner 26 is brought into intimate face to face engagement with circumferential surface portions of respective core rods 50 and such liners 26 are held against the rods 50. At the initiation of the next subsequent indexing step a check valve 104 associated with conduit 20 is closed thereby maintaining subatmospheric pressures in conduit 20 and the individual core rods 50. This pressure is maintained throughout the entire next processing steps carried out at station B upon the core rods 50 thus provided with liners 26.

Alternatively, instead of conduit 20 being placed in fluid communication with line 100 by means of low pressures associated with the suction side of a pump 102 which operates continuously, the line 100 may be associated with an accumulator vessel (not shown) which itself is held at low pressures by an intermittently operating vacuum pump (not shown) whose operation is regulated by functionally associated pressure switches and the like.

After the platen or turret 12 has been raised, indexed, and lowered with the liner-covered, vacuumized core rods 50 being duly positioned in respective injection molds 22 located at injection station B, hot plastic 30 is injected through injection nozzles 32 over the individual liners 26 between the contured cavity surfaces 36 of the injection molds 22 to form a plurality of composite preforms 34. Typically, from about 4 to 10 such preforms 34 may be simultaneously formed by a single set of core rods located in one side of platen 12. Generally, liners 26 are temperature conditioned on their respective associated core rods 50 for a given time period prior to being exteriorally contacted by a layer of hot injected thermoplastic resin at station B.

As will be understood from the preceding description herein, simultaneously with the injection operation occurring at station B, a liner loading operation is occurring at station A with other liners 26 and another set of core rods 50 located along an adjacent side of turret 12.

When turret 12 next undergoes its indexing sequence through another segment of machine cycle, the composite preforms 34 are transferred from station B to station C within the respective individual blow molds 24 located in station C with the preforms 34 now being at an overall generally uniform temperature as desired for expansion (blowing). As the conduit 20 associated with the preform 34 equipped core rods 50 comes into position at station C, it is placed in fluid communication by line 26 with the discharge side of a fluid pressure pumpt 108 associated with line 106. A mechanical disabling means (not shown) disengages check valve 104 from its closed position, which changes pressure inside each core rod to atmospheric. Also, the upset means (not shown) in turret 12 engages and functions to move again the head member 52 of each core rod 50 into the dotted line position shown in FIG. 3, thereby providing again the aperture between body member 54 and head member 52 in the region of shoulder 94 for fluid passage therethrough here from orifice 90 via chamber 22 and passage 86. The fluid passageway from orifice 90 to porous metal section 70 is also open. A pressurized fluid (e.g., compressed air or other gas) is thus permitted to flow through the passageway 58 of each curved rod 50 and to exit between head member 52 and body member 54 thereof thereby permitting the composite preforms 34 to expand and move against the contured cavity surfaces 38 of each associated blow mold 24 and thereby form a plurality of containers 40, one on each core rod 50.

Thereafter, another segment of machine cycle is initiated, the platen 12 is caused to raise index and then lower at the product removal station D where the thus formed containers 40 are ejected by a mechanical means or the like onto a conveyor 42 for subsequent processing operations (not shown), such as inspection, filling and packaging. It is to be understood that since each one of the four sides of the platen or turret 12 is provided with a similar set of core rods 50, each core rod set is in a different operational step or segment of one complete machine cycle at any given time.

As herein above indicated, use of a porous metal core rod 50 of the present invention in a machine which is modified to permit the application of a vacuum within such core rods 50 during liner placement permits such vacuum to be applied during liner placement on core rods, to be maintained during injection molding at preform 34 formation and to be released before blowing. The vacuum holds the liners and prevents air pocket formation between a core rod 50 and a liner 26. By this arrangement, liner creasing may be substantially completely eliminated and product blown container defects are minimizable or completely eliminated. Another advantage of a core rod 50 of this invention is that it can make a fit between a liner and a core rod less critical than in the prior art so far as the production of commercial quality blown containers is concerned. Also, liner dimensional tolerances in relation to a core rod size are not as critical when making multiwalled containers by injection blow molding when using a core rod 50 which can be a significant cost saving feature from the standpoint of liner production.

Another feature is that the internal configuration of a core rod 50 allows for the introduction and passage of a conditioning fluid, if desired, therethrough, such as hot air or other hot gaseous fluid during a start-up of a machine 10 and its blow molding assembly. Also, a conditioning fluid can advantageously be fed through a core rod 50 after product container removal therefrom, and before implacement thereon of a liner during a production cycle, if desired.

The uniform passage of a conditioning fluid, such as compressed air or the like, through the porous face portion or section 74 of a core pin member 72, in a core rod 50, is enhanced by the helically extending thread-like ribs thereof, including the flat crests on the intermediate section 78 of the support member 72. Such a set of helically extending threads apparently enhances the even and uniform exiting of a conditioning fluid through the surface portions of section 74 owing to the nature of porous metal. However, it will be understood that while the intermediate section 78 is here formed with a helically extending thread section or portion the intermediate section 78 of a support member 62 may take other shapes, such as a star-shape support member in axially alignment with a core pin member having flat axially and radially extending flat crests which contact an inner wall surface 70 of a core pin member 60. The flat crests of threaded intermediate portion 78 is presently preferred in order to provide a significant area of contact so as to enhance support for the core pin member 60 as well as to enhance conductive heat transfer from a tip section of core pin member 60 to the interior portion of the core pin support member 62.

As hereinabove indicated, the support member 62 is preferably formed of a heat conductive material, such as copper or the like, to provide for the appropriate removal of heat, especially from the end portion 80 of the core pins 50, since the tip or end portion 80 thereof is normally subjected to higher temperatures as a result of the positioning of the hot plastic injection nozzles 32, that is, generally opposite such end portion during the injection portion of a machine cyle. Consequently, in a preferred configuration, porous metal is not formed over the tip of the end portion 80. As hereinabove discussed, a core pin assembly 50 is associated functionally with the platen 12 and may be provided with suitable conduits for the passage of cooled or heated intermediate heat transfer medium therethrough to maintain desired temperature levels for core rods (together with other potential conditioning requirements).

As will be appreciated by one skilled in the art, the base portion 72 of the core pin member 60 is formed of tool steel or stainless steel to provide for a stronger contacting surface between the core pin head member 52 and the body member 54 at the surface 94 thereby substantially lengthening the useable life span of such a core rod 50 as distinguished from the use of a core pin member 60 formed entirely of such porous metal. It will be understood by those skilled in the art that the optimized relative positioning of a blow slot in a core rod of this invention will vary depending on the plastic composition of the composite preforms involved in any given use situation as well as upon machine operating conditions. For instance, for polystyrene, the blow slot can be positioned as generally illustrated in FIG. 3, whereas for polyolefin, the blow slot can be generally located near a tip of a blow core.

Additionally, while the present novel core rod assembly has been disclosed with reference to a rotary injection blow molding apparatus having a plurality of blow cores disposed along each side of the platen or turret thereof, it will be understood and appreciated that the core rod assembly may be used in any process and apparatus for injection blow molding of articles (containers), such as a linear transfer injection blow molding apparatus utilizing a single core rod, or the like.

It will be further appreciated that a core rod fabricated of a porous metal may be used as the male member of a molding dye in a vacuum thermoforming process and apparatus to form the liner to be subsequently used in the hereinabove discussed process and apparatus for forming barrier containers (eg. multiwalled containers having at least one barrier layer of thermoplastic resin and at least one support layer of thermoplastic resin).

Figures 4, 5, 6:
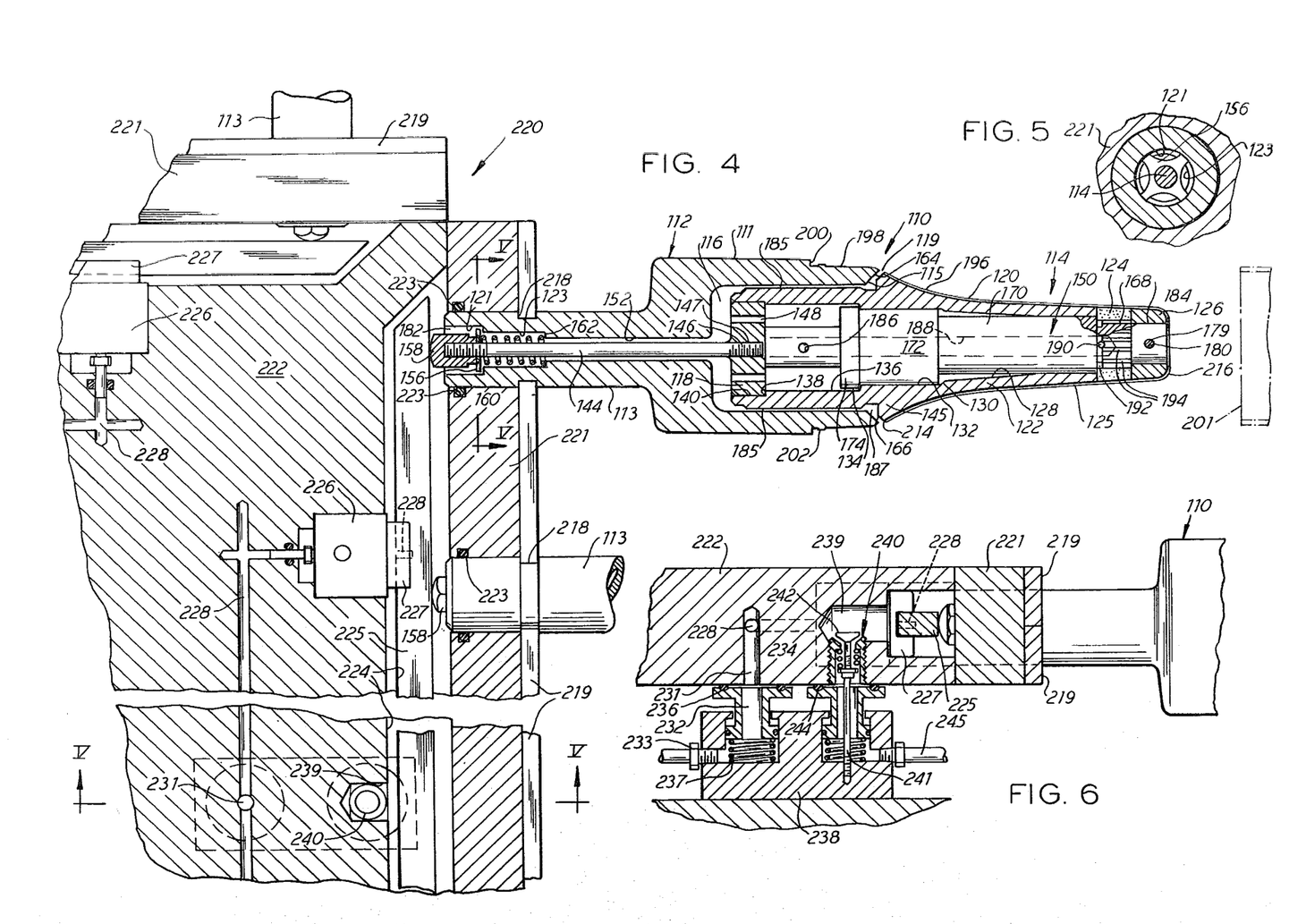
FIG. 4 is a fragmentary sectional view horizontally taken through a preferred embodiment of a four stage rotary injection blow molding machine of the present invention which utilizes a blow slot equipped core rod assembly which incorporates a porous metal wall portion.
FIG. 5 is a vertical sectional view taken generally along the line V—V of FIG. 4.
FIG. 6 is a sectional view transversely taken generally along the line VI—VI of FIG. 4.

Referring to FIG. 4, there is seen another embodiment of a core rod assembly, generally designated as 110, comprising a body or support member 112 and a core rod head member 114.

The support 112 is generally goblet shaped, being provided with an upper generally cylindrically sided cup section 111 and on integral lower stem section 113 which is coaxial with such cup section 111. A channel or base 152 axially entends through stem 113. Section 111 has a mouth 115 which is coaxial with the inside walls of section 111.

The open end of stem 113 is counterbored by a first channel 121 and by a second channel 123 which is deeper than first channel 121 and of smaller diameter. Both channels 121 and 123 are coaxial with channel 152.

The core rod head 114 is generally cross sectionally circular externally and incorporates a disc-shaped base 118 and an elongated hollow core 120. The main section 122 of core member 120 is comprised of a single piece of material, such as hardened cold rolled steel or the like, and is abuttingly engaged at the front end thereof with a sleeve section 124 of a porous metal meterial which has a multiplicity of discrete passageways formed therein during fabrication thereof such as from sintered stainless steel pellets, or the like, as more particularly described hereinafter.

The forward inner wall surface portions 128 of main section 122 are formed with a taper so that the internal diameter of hollow core member 120 in this region declines with increasing distance from base 118. Behind portion 128 is a cylindrical surface 132 which terminates in a shoulder 130 that is adjacent portion 128. Behind surface 132 is another cylindrical surface 134 having a larger diameter than that of surface 132; surface 136 terminates in a shoulder 134 adjacent surface 132. Surface 136 may be slightly tapered, if desired. Behind surface 136 is a rear cylindrical surface 140 which has a larger diameter than surface 136. Surface 140 terminates in a shoulder 138 adjacent surface 136.

The base 118 has circumferential outer walls which are press fitted into and along surface 140 against shoulder 138 across the rear opening 142 of main section 122. The base 118 is also provided with an axially extending threaded tap 147 and a plurality of bores or orfices 148 which are in radially spaced relationship to tap 147 and in circumferentially spaced relationship to each other. An actuator rod 144 which is threaded at its opposite ends is engaged at one end thereof with tap 147.

The rear portion of main section 122 has an outside diameter which is less than the inside diameter of cup section 111 so that such is receivable therewithin coaxially until a circumferential shoulder 145 on the outside of section 122 engages an inner ledge 164 on the rim of the mouth 115 of cup 111.

Rod 144 entends loosely through channel or bore 152, bore 121 and bore 123, and is threadably connected to star nut 156 and locking nut 158 which are in channel 121.

Compression spring 160 is positioned about rod 144 in channel 123 between star nut 156 and shoulder 162 at the end of bore 152. Spring 160 biases the rod 144 and core 120 to a seated engagement with mouth 115 where annular beveled ledge 164 on body 112 nests against annular beveled ledge 166 on base 122, to thereby normally form an annular blow slot 119 defined between body 112 and head 114. During portions of one cycle of injection blow molding, as herein elsewhere explained, a machine in which the core rod assembly 110 is employed applies pressure upon nut 158 to open blow slot 119 against the bias of spring 160. The applied pressure pushes actuator rod 144 forward against the biasing force of spring 160 and causes ledge or seat 164 to move away from ledge or seat 166, thereby providing a space or blow slot 119 therebetween.

Insert 150 has a heat transfer function; it abutts against front side of disc 118 and coaxially extends through core 120. It has, successively, a first cylindrical 184, a second cylindrical section 168 of greater diameter than section 184, a third cylindrical section 170 of greater diameter than section 168, a fourth still greater diameter cylindrical section 172 with a rim 174 which appears around its outer rear surface, and a fifth or rear reduced diameter cylindrical section 176. When mounted within core 120, the front surface of 184 of insert 150 is conterminous with the frontal surface of the tip 126 with the rim 174 of insert 150 abutting against shoulder 134 and the front ede of section 170 abutting against porous ring 124. When so mounted, the outer surface of section 168 of insert 150 contacts the respective inner surface of tip 126 and porous ring 124. In addition, the front portion of the outer peripheral surface of section 170 of insert 150 is in contact with the inner surface 128 of core 122. The contacting surface of ring 126, insert 124, and main section 122 with insert 150 provides for the dissipation of heat from the front of core pin 120 to its rear portions. Cylindrical portion 168 of insert 150 extends through porous sleeve 124 and a retaining collar 126 is mounted circumferentially about cylindrical section 184. Collar 126 is secured to insert 150 by a retaining pin 179 extended into hole 180 diametrically through collar 126 and second 184. Porous sleeve 124 is thus secured in place on insert 150 between collar 126 and main section 122.

Insert 150 is generally formed of a heat conductive material, such as copper, a copper alloy, or the like, to provide for the removal of heat, especially from the front end portion of core 120, since the collar 126 thereof is normally subjected to higher temperatures as a result of the positioning of the hot plastic injection nozzles generally opposite such end portion during the inject phase of a machine 10 cycle (see, for example nozzle 32 in FIG. 1). Consequently, in a preferred core rod assembly configuration, porous metal is not used in the collar region 126 since a solid metal region here more readily allows transfer of heat therefrom to an adjacent insert 150 and thus aids in the prevention of localized overheating of the forward portion of a core rod of this invention.

For occurring during a blow molding cycle, air passageway means are provided between rear opening 182, end bore 152 and porous sleeve 124. Tracing this passageway which is primarily in evacuation from rear opening 182, air can pass around star nut 156, through bore 123 and 152 in support member 112, orifices 148 in base 118, and into the interior of insert 150 by means of hole 186 in insert 150. The air is allowed to pass through a major length of insert 150 by means of bore 188, axially positioned within insert 150 and terminated in intermediate front section 168. From bore 188, air passage continues in an outward direction through hole 190 in insert 150 this communicating bore 118 with an annular groove 192 in the outer peripheral surface of section 168 of insert 150. Communicating with annular groove 192 are a plurality of air passageway channels 194 extending axially along the length of the outer surface of section 168 adjacent porous sleeve 124. Communication is thereby provided between channels 194 and porous sleeve 124.

In addition, for pressurization during a blowing operation, a passageway is provided from rear opening 182 to blow slot 119 by means of bores 123 and 152, chamber 116 and flats 185 axially extending along a surface portion of core 122. Annular recess 187 is provided around core rod base 122 to aid the flow from flats 185 to blow slot 119 when blow slot 119 is in the open position. A small amount of air also exits from porous sleeve 124 during blowing; however, the major portion of the blowing function occurs through blow slot 119.

The outer surface of main section 122 here has an optical tapered portion 196 for guiding the open end 199 of a liner 201 (shown in phantom in FIG. 4) to a position adjacent cylindrical surface 198 of core body member 112 as liner 201 is inserted over core rod head 114. The edge of the open end of liner 201 abutts annular shoulder 200 of body 112 at the termination of the insertion movement.

To prevent only substantial shrinkage of liner 201 as the liner becomes heated from its contact with core 120, an annular ridge 202 on surface 198 is provided. As the liner 201 becomes hot, a portion of liner 201 conforms around ridge 202 to secure the liner 201 adjacent its open end 199 to the support 112.

A polytetrafluoroethylene layer 125 is coated onto, or otherwise applied to core 120 on the surface areas to be covered by a liner such as liners 201. As indicated in FIG. 4, the layer 125 extends from the back edge 214 of tapered portion 196 up to and including front edge 216 of core rod head 114.

It is preferred that the ledge 164 on support 112 and ledge 166 on core 120 be not coated with layer 125 to avoid the possibility of adversely affecting the sealing of blow slot 119 as ledges 164 and 166 engage each other.

It is also preferred that the surface 198 on support 112 be not be coated with layer 125 because if this area were so coated, then the reduced coefficient of friction might tend to increase shrinkage or slippage of a liner 201 and counteract the gripping function provided by ridge 202 as previously discussed. Also, since the portion of a liner 201 contacting surface 198 is not blown, and since such portion is generally not as hot as the forward area thereof, there is reduced tendency for the liner to exhibit undesirable sticking in the adjacent surfaces 198.

In the application of a layer 125 to cores 120 having porous section 124, any conventional appropriate coating procedure may be used. However, it is now preferred to spray a liquid polytetrafluoroethylene system on a core 120 to a thickness of about 0.0005 inch, including a front face portion section 184 of insert 150 if the front face of section 184 is to contact a liner 201 as in in FIGS. 1 and 2, and then is baked until such coating becomes a solid.

The porous material of porous section 124 is formable by any convenient conventional techniques and preferably is now comprised of sintered metal particles, such as 316L stainless steel or the like. Preferably the porous metal section 124 has a filtration rating of $\frac{1}{2}$ to 5 microns.

Porous metal pore size ratings of from about 0.5 to 5 microns are preferred. Pore sizes above about 5 microns may cause markings to be picked up by the liners or parisons which markings may thereafter appear upon a finished container which may be undesirable in commercial quality containers.

A 0.0005 inch thick single layer of coating 125 is preferably applied to a core rod 120 over the porous section 124 in addition to the other surface areas indicated. Quite surprisingly, it is found that such a coating 125 does not plug pores of porous section 124 so as to prevent effective passage of air therethrough.

Polytetrafluoroethylene is available commercially as "Teflon" (a trademark of the DuPont Company). "Teflon-S" is the preferred coating and can be applied as a liquid in a single coating to a clean, untreated metal.

Layer 125 reduces sticking problems, tends to act as an insulator to prevent the overheating of a liner 210 without the use of cooling devices, and aids in the evacuation of air between a core rod and a liner.

The support 112 of core rod assembly 110 is circumferentially grooved in a location 218 adjacent the open end of stem 113. The groove 218 permits the entire core rod assembly 110 to be conventionally mounted in a retaining strip 219 forming part of the assembly of the turret 220, such turret 220 being similar to 12 in structure and function and therefore adapted for use in the machine 10, as hereinafter described. (See FIGS. 4 and 5, for example.)

The retaining strip 219 is bolted to a retaining bar 221 (bolts not shown). The retaining bar 221 is in turn bolted to the body 222 of turret assembly 220. The bar 221 is provided with as many mounting holds 223 as is desired for the number of core rod assemblies 110 to be used with a given turret assembly 220 in any given circumstance. Suitable O ring sealing means 223 or the like are provided to provide a gas type joint between the stem, section 113, and the bar, 221. A channel 224 is provided in the body 222 which interconnects with each of the openings, 182. Located in the channel 224 along each side of the body 222 is an actuating bar 225 which is mounted for reciprocal transverse movements towards and away from the retaining bar 221. The bar is thus adapted to make contact with the head portion of each nut 158 which thereby permits the bar 225 to effectuate opening movements of the blow slot 119 of each core rod assembly 110. The actuating bar 225 is itself moved against the nuts 158 by means of a fluid cylinder assembly 226 whose piston is slotted to receive the bar 225. The piston 227 is also adapted to receive a pin 228 so that the combination of pin and slot controls positioning of the bar 225 (that is, the bar is upheld and prevented from shifting laterally thereby). The cylinder 226 is itself seated in the body 222 of turret 220 by any convenient means (such as screws or the like). A system of pressurizable passageways 228 is provided in the body 222 for supplying to piston 226 with pressurized fluid (such as compressed air or the like). When pressure is applied to a cylinder assembly 226 through the system of channels 228 the piston 227 is actuated thereby moving the bar 225 so as to open the blow slots 119 of the individual core rod assemblies 110. The bar 225 moves against the biasing force exerted by 160 in each core rod assembly 110. When pressure in the cylinder's assembly 226 is cut off, the springs 160 function to close each blow slot 119 and to retract the piston 227 into cylinder assembly 226. Each set of core road assemblies 110 thus mounted in each side 230 of the turret assembly 220 is similarly provided with means for controllably opening the respective blow slots 119 of the core rod assemblies 110 associated therewith.

When a turret assembly 220 is operatively associated with a machine 10 in the manner of turret 12, the control actuation of the bar 225 is accomplished as follows at a station, such as station A in FIG. 1: A pore 231 formed in the lower face of body 222 communicates with the passageway system 228 centrally. When, for example, turret assembly 20 has been duly indexed to station A, the port 231 comes into registration with a pressure port 232 of a pressurized fluid supply system generally designated by the numeral 233. In order to make a fluid tight seal between the port 231 and the pressurizable fluid system 233, a so-called mushroom head is employed in the embodyment shown, such mushroom head sub-assembly being designated in its entirety by the numeral 234. Here the mushroon head has a face portion 235 which is associated with O-ring sealing ring 236. When the turret 220 is duly in position at station A, the O-ring seal 236 accomplishes a gas type seal with body 222 and the mushroom head 234 is depressed against the yielding bias of a compression 237 associated with the fluid supply system 233. The fluid supply system 233 can be of conventional construction and, as such, does not constitute a portion of the present invention. The pressurizable fluid supply system 233 in the region of the turret assembly 220 at station A is housed in a pressure block 239. The pressurizable fluid supply system 233 is actuated so as to deliver a pressurized fluid to the system of passageways 228 by the machine 10 control system (as hereinafter discussed).

In order to control the pressure within the core rod assemblies 110 at station A when the blow slots 119 of the individual core rod assemblies 110 are thus opened by actuating bar 225, the following arrangement is provided: A vacuum system at station A is provided which provides sub-atmospheric pressures within an individual core rod assembly 110 not only at the blow slot 119 thereof, but also in the region of porous sections 124 thereof. The channel 224 is in fluid communication with a central passageway 239 in body 222. The passageway 239 is provided with a check valve assembly 240 which is positioned in body 222 so as to be openable and closeable by an actuating rod located beneath the body 222 but aligned with the check valve assembly 240 when the turret assembly is in a properly indexed location, such as, in the illustrative example, position A. Specifically, a push rod 241 opens the check valve assembly 240 by contact with a poppit valve 242. Thus, when the turret assembly 220 has completed an index and is located at station A in registration with lock 238, a second mushroom head sub-assembly 243 comes into registration with that region of body 222 circumferentially located around the check valve assembly 240 and an O ring seal 244 makes a sealing engagement with body 222. The operation of the mushroom head 243 is similar to that of mushroom head 234 and such operations are conventional to those skilled in this art. A conduit 245 interconnects with the region of mushroom head 243 so that when the push rod 241 has opened poppit valve 242 sub-atmospheric air pressures may be exerted past the valve assembly 240 in the interior of each core rod assembly 110, so that all of the core rod assemblies along one side of the turret assembly 220 are vacuumized in the region of station A. Any convenient means for supplying a sub-atmospheric vacuumized gas pressure to conduit 245 may be employed, as those skilled in the art will appreciate. It is noted that, referring to FIG.

2, check valve 104 is comparable in function and operation to the check valve assembly 104.

With the core rod assemblies 110 at station A thus vacuumized with the respective blow slots 119 open, the liners 201 are individually loaded over each core rod assembly 110. When the liner loading operation at station A is completed, the machine 10 is subjected to an indexing operation under which the turret assembly 220 operates similarly to turret 12. Thus, the turret assembly 220 is raised, indexed and lowered. As soon as the turret assembly 220 is raised, the check valve assembly 240 is closed thereby holding sub-atmospheric pressures in central passageway 239 and consequently in the interior of each core rod assembly 110. Because of the close-fitting nature of liner contact 201 with each core rod assembly 110, a sealing engagement exists there between so that air pressure is not appreciably lost between each liner 201 and its associated core rod assembly 110. Continued movement of the turret assembly 220 upward then breaks the sealing connection between the body 222 and the mushroom head 243.

Concurrently, as the turret assembly 220 is being raised, fluid pressure is cut off in pressurizable fluid supply system 233 (by means of valve means not shown but see description below) and as the turret assembly continues to raise disengagement occurs between the mushroom head 234 and the body 222. Thus pressure is lost in cylinder assembly 226 and the blow slots 119 of all associated core rod assemblies 110 are closed.

When these liner-equipped vacuumized core rod assemblies 110 become indexed and located at station B, as is above-described and as below described, at station B the normal and usual injection operation takes place wherein a pre-form assembly utilizing the liners 201 takes place. Observe that during the operations at station B, vacuum is continuously maintained within the individual core rods 110 located thereat and also observe that the blow slots 119 of all core rods remain closed, in the present preferred mode of operating this invention. However, optionally, during the injection operation occurring at station B one could have means similar to that above described in relation to station A for fortifying the vacuum pressures within the individual core rods 110. The maintenance of a relatively low vacuum pressure on the core rods 110 may be advantageous when using certain types of plastic which have viscosity characteristics and heat-softening characteristics as such that close contact between core rod assemblies and liners should be maintained for optimum product container quality.

After the injection operation at station B is duly completed, a cycle of indexing is undertaken for turret assembly 220 and the assembly 220 is thus rotated so as to bring the core pins which were previously at station B around so that they are now resident at station C. During this rotation, a vacuum is still maintained in the individual core rod assemblies 110. However, as the turret assembly 220 descends, the core rod assemblies at station C are subjected to pressurization in the following manner: an arrangement similar to that shown in FIG. 6 is implaced at station C. Again, pressure in system 228 is achieved so that the blow slots 119 of all core rod assemblies are open. However, in addition, when the check valve assembly 240 is opened by push rod assembly 241 at station C, pressurized fluid is admitted through channel 245. Observe that as soon as the poppet valve 242 is displaced, the vacuum pressure within the individual core rod assemblies is lost. The air pressure in conduit 245 is adjusted so as to achieve a predetermined desired gas pressure or fluid pressure at blow slots 119, this pressure being sufficient to expand the preform system on the core rod assemblies 110 into engagement with the adjacent wall portions of the blow holds at station C. Because of the pressure/time considerations involved, the blowing accomplished at station C is achieved largely with fluid pressure developed through the blow slots 119 rather than through the pores associated with the sleeve 124. Typically, the rate of gas flow through a sleeve 124 is less than that which is sufficient to build up the desired gas pressure level between the core rod 110 and a preform thereon during the cycle time of a blowing operation at station C.

Thereafter, after the blowing operation at station C is completed, gas pressure in conduit 245 is cut off (that is vented) so as to allow the super-atmospheric fluid pressure with individual containers 40 to vent to atmosphere.

Next another cycle of machine indexing is undertaken and the turret assembly is raised, rotated and permitted to descend so that the finished container may be ejected at station D routinely. In normal operation, in accordance with the practice of this invention, no pressurization or vacuumization of core rod assemblies 110 occurs. However, under certain operational conditions, such as at the time of machine 10 start-up, it has been found advantageous to be able to pressurize containers at station D for removing same from the core rod assemblies 110 since at station D during a start-up mode the temperature of the core rod assemblies 110 may not be sufficiently high to achieve a simple and convenient removal of form containers therefrom.

Figures 7, 8, 9, 10:
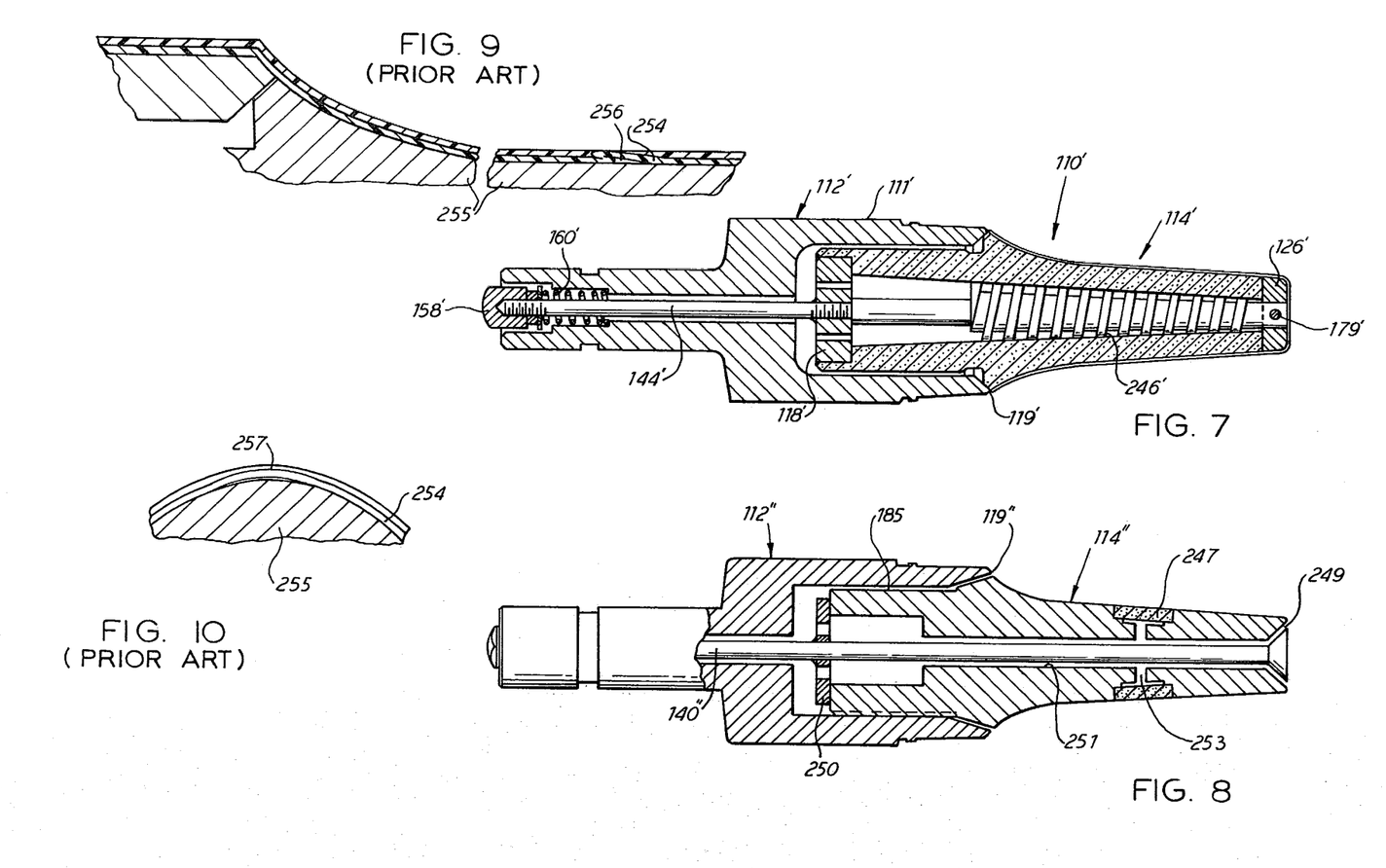
FIG. 7 is a view similar to FIG. 3 but illustrating an alternative embodiment of a porous core rod assembly of the present invention.
FIG. 8 is a view similar to FIG. 3 but showing a further alternative embodiment of a core rod assembly of the present invention.
FIG. 9 is a fragmentary longitudinal sectional view through a core rod assembly of the prior art illustrating certain problems experienced in the prior art.
FIG. 10 is a fragmentary vertical sectional view through a prior art core rod assembly illustrating certain prior art problems.

Referring to FIGS. 7 and 8, embodiments of alternative core rod assemblies of this invention are seen illustrated. In the case of FIG. 7, components thereof which are similar to the components of core rod assemblies 110, are similarly numbered but with the addition of prime marks thereto. Similarly, in the case of the embodiment shown in FIG. 8, the components which are similar to the components of core rod assembly 110 are similarly numbered but with the addition of double prime marks thereto.

Embodiment 110 prime employs a core rod head 114 prime wherein substantially the entire circumferential body portions are comprised of a porous metal except for the retaining collar 126 prime. The core however instead of being like insert 150 provides a fluid communication along substantially the entire tapered surface region of head 114 prime by means of a spirally threaded section 246.

The embodiment shown in FIG. 8 employs a porous metal sleeve 147 inserted circumferentially about the body of a core rod head 114 double prime which body 114 double prime is comprised of tooled steel or the like. In this embodiment, the push rod 144 double prime extends axially through the core rod head 114 double prime and when actuated a blow slow 249 opens at the tip region of head 114 double prime. Immediately after the blow slot 249 opens a secondary blow slot 119 double prime opens because an actuating ring 250 carried by the rod 114 double prime butts the back of the head 114 double prime and moves the same reciprocally and axially. A gas passageway circumferentially around rod 144 double prime permits delivery of pressurizing fluid to channels 253 which radially extend outwardly from channel 251 so as to pressurize or vacuumize the section 247, as desired.

4,295,811

10

The type of problems occurring by the core rod insert provided by the core rod construction of the present invention are illustrated in FIGS. 9 and 10, making a multi-wall type of blister pack container of li... is developed in multi-walled container molding is illustrated. He... core rod assem... pocket...

operatively in position at station C. After a suitable length of time, the valve 289 is deactuated by solenoid 288 thereby venting air from the interior of the core rod assemblies 110 as well as from the interior of the blown containers. Then the machine is sequenced as described above, (involving raising, indexing and lowering turret 272) so that the blown bottles become positioned at station D. At station D a stripper bar 292 comes into operation and, in its position, pulls the blown containers away from engagement at their neck portions from the respective cylindrical core rod assemblies 110. To achieve this effect, solenoid 293 is actuated by control unit 260 thereby to operate valve 294 which, in turn actuates cylinder 295 thereby causing the stripper bar 292 to translate and achieve its working function as described. At the end of its stroke cylinder 295 has brought a stripper bar 292 into engagement with the sensor 296 whereupon solenoid 293 is deactuated and the cylinder 295 returns the stripper bar 292 to its start position.

Finally, the machine is sequenced once again, in the manner earlier described, to bring the core rod set back into a liner loader configuration so as to complete one full operation of machine cycling.

The porosity rating of a porous metal insert used in a core rod as herein described can be measured by any convenient procedure. One presently used procedure involves the use of a curve chart wherein pressure (in pounds per square inch) is plotted against porosity in microns. To use this chart, a porous metal sleeve or other porous metal shaped component of a core rod of this description is immersed completely in an alcohol and then is clamped in a holder so that compressed air can be forced through such component, the pressure being applied in a direction and manner corresponding to that as used respectively in an actual core rod. For example, when such component is sleeve-shaped, the air is forced radially through from the inside out with the opposed side wall portions thereof being clamped in a gas tight arrangement. Gas pressure against the component (as indicated) is increased until bubbles start to appear on a side of such component generally opposed to that against which such pressure is applied at which point the pressure is noted, compared to the chart, and the porosity value in microns read off.

Figure 12:
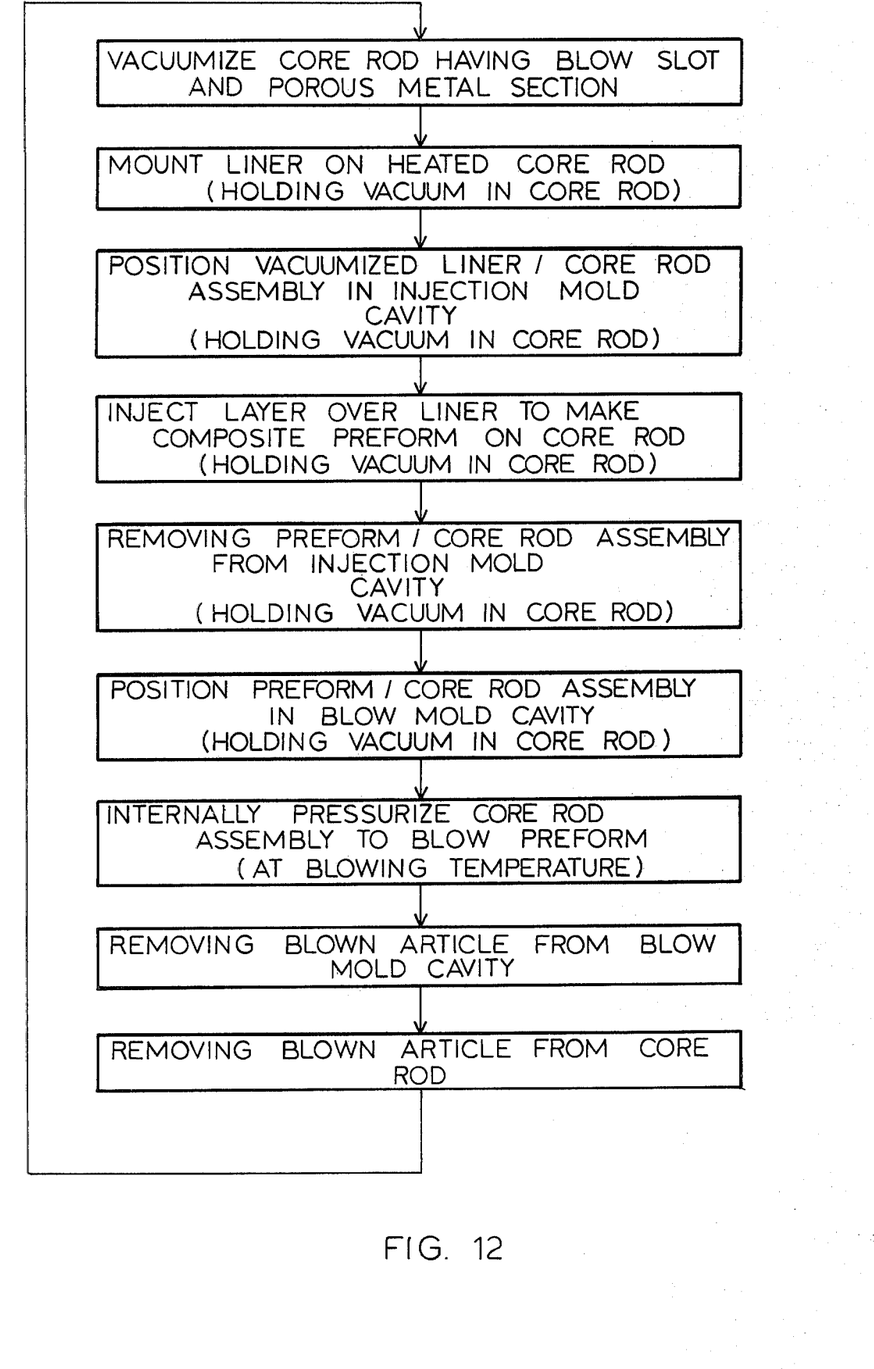
FIG. 12 is a flow sheet illustrating one embodiment of the process step sequence employed in using a porous blow slot equipped core rod assembly in an injection blow molding operation.

The process step sequence utilized in the invention is shown in FIG. 12.

In general, the apparatus of this invention is usable for forming hollow multilayered thermoplastic articles by injection blow molding using a blow slot equipped core rod having a porous metal section incorporated thereinto and wherein there is internal fluid passageway longitudinally extending from a rear portion of said core rod to each of said blow slot and said porous metal section. The apparatus utilized liner loading means for such core rod, injection mold means, for such core rod, blow means for such core rod, and blown article removal means for such core rod. A core rod transfer means is incorporated into the system for relatively moving said core rod between said liner loading means, said injection mold means, said blow mold means, and said removal means. The core rod transfer means may involved rotational movement, linear tranfer, or the like, as those skilled in the art will appreciate. In addition, the apparatus employs a control scheme for sequencing the stages of machine operations such as regards subassembly operations, timing, and the like, as those skilled in the art will appreciate.

Figure 11:
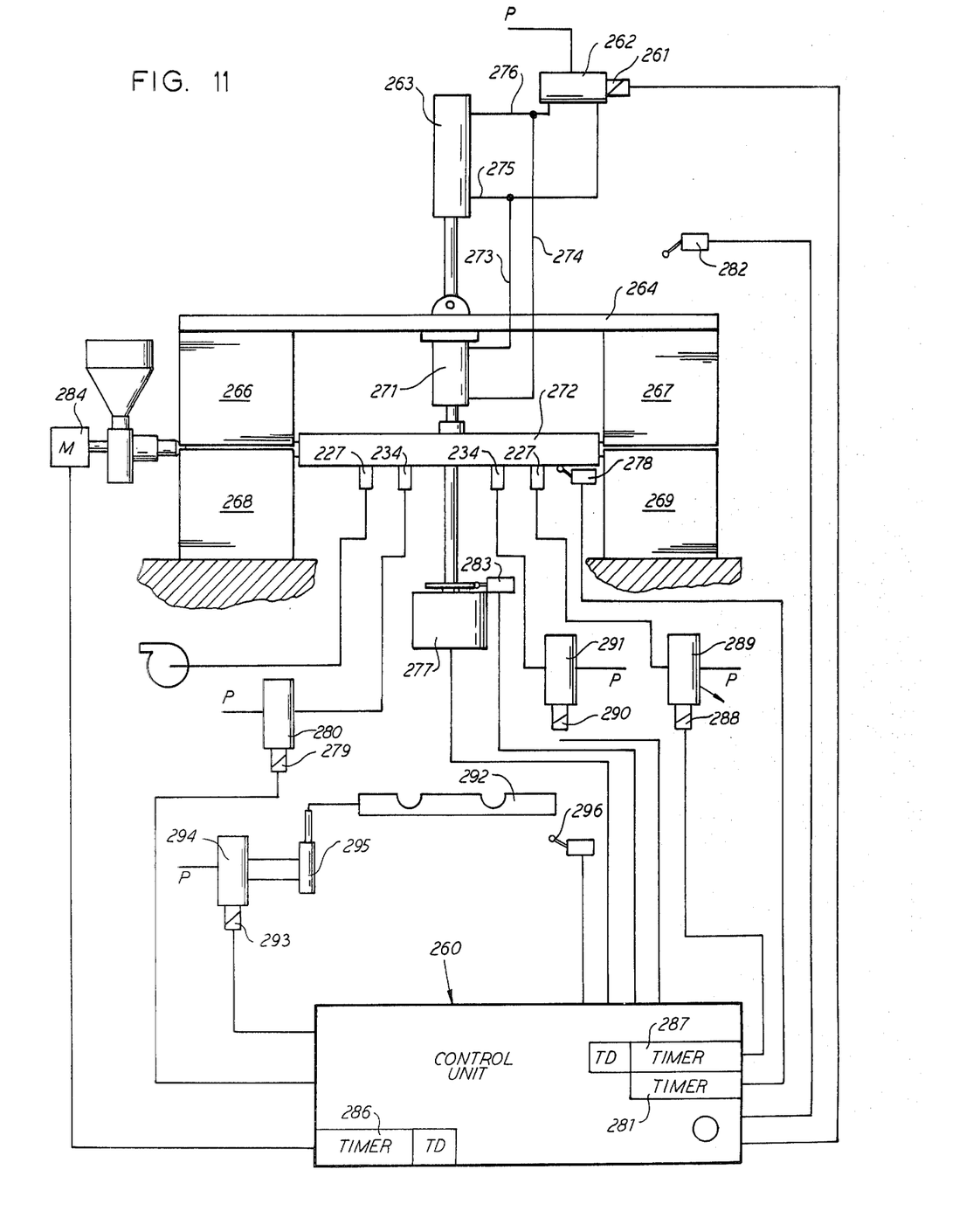
FIG. 11 is a diagrammatic representation of a controlled arrangement of the type utilized for controlling and operating a four stage rotary injection blow molding machine in a simplified format.

It is one of the distinct advantages of the present invention that the apparatus of the present invention can be used with a conventional injection blow molding machine without the necessity to redesign the machine and/or otherwise drastically alter the existing machine structure, including the modification of control subassemblies. The present invention permits one to employ a blow slot equipped, porous metal section equipped core rod into an existing injection blow molding machine in a simple and direct manner, as can be seen from the preceding Detailed Description. For example, a Machine 10 is modified so as to incorporate the apparatus of this invention by the addition of an appropriate check valve, a second set of pressure connections at the liner loading station, a set of vacuum connections at the liner loading station, and upset valve opening means at the blow station and also at the liner loading station, and by a simple modification of the control means such as by adding components identified as 279 and 280 plus a vaccum connection in the Embodiment above described in relation to FIG. 11.

Although the teachings of our invention have herein been discussed with reference to certain specific disclosures and embodiments, it is to be understood that these are by way of illustration only and that others may wish to utilize our invention in different designs or applications.

I claim:

1. In apparatus for forming a hollow multilayered thermoplastic article using a normally closed blow slot equipped core rod having a porous metal section incorporated into a forward outer surface portion thereof and wherein an internal fluid passageway longitudinally extends from a rear portion of said core rod to each of said blow slot and said porous metal section, said apparatus additionally including liner loading station means for loading a liner over said core rod, injection mold station means for forming a parison over said liner on said core rod to form a multilayered preform, blow mold station means for blow molding said preform on said core rod to form a blown article, blown article removal station means for removing said blown article from said core rod, core rod transfer means including rotary means and coacting stationary means for relatively moving said core rod between said liner loading station means, said injection mold station means, said blow mold station means and said removal station means, and control means for operating said core rod transfer means, said liner loading station means, said injection mold station means, said blow mold station means, and said blown article removal station means for producing a hollow multilayered thermoplastic article by injection blow molding, the improvement which comprises:

(A) means for opening and then closing said blow slot when said core rod is located functionally adjacent said blow station means, (B) first detachable connection means, located at said liner loading station means, for connecting said internal fluid passageway with a vacuum source, (C) second detachable connection means located at said blow mold station means for connecting said internal fluid passageway with a pressurized fluid source, (D) means to effectuate connection between said first detachable connection means and said internal passageway when said rotary means has moved said core rods into position at said liner loading station and between said second detachable connection means and said internal passageway when said rotary means has moved said core rods into position at said blow mold station means, and (E) valve means associated with said rotary means for closing said internal fluid passageway to maintain a vacuum in said liner loaded core rod during the period when (a) said internal fluid passageway is detached from said first detachable connection means, (b) said rotary means is advanced first to said injection mold station means and then to said blow mold station means, and (c) said second detatchable connection means is so connected with said internal fluid passageway.

2. The apparatus of claim 1 wherein said core rods are carried by a rotatable, reciprocatorily elevatable turn table which carries said core rods from one of said stations to a next progression and wherein the make and break connectors between said vaccum source and said fluid passageway, and between said pressurized fluid source and said fluid passageway, respectively, are accomplished by the reciprocating elevating movements of said turn table.

3. The apparatus of claim 1 wherein said means for opening said blow slot includes a fluid activated cylinder said cylinder being selectively activated concurrently with said reciprocating elevating movements of said turn table at said blow mold station means.

4. In an improved automatic injection blow molding apparatus of the type having a plurality of work stations to each of which a set of normally closed blow slot equipped core rods in a movable frame is sequentially indexed in a stop and go manner and wherein at a first work station thermoplastic liner loading means is provided for fitting each core rod of one such set with a thermoplastic liner, at a second said work station thermoplastic injection molding means is provided for each such liner fitted core rod of said one set for injection molding over each such liner a layer of a thermoplastic to form a preform, at a third said work station blow molding means is provided for each such preform on its associated core rod of said one set for blow molding a predetermined article from said preform, and at fourth said work station article separation means is provided for removing each such article from its associated core rod of said one set, the improvement which comprises:

(A) including into each said blow slot equipped core rod of each said set in the portion thereof which is over fittable with a liner, a forward outer section comprised of a porous metal and further including therein passageway means to said blow slot and to said porous metal section from a single location on each said core rod, (B) including in said frame channel means for supplying fluid internally to each said core rod of said set, said channel means having a normally closed valve means, (C) including at said first work station a vacuum connection means to said channel means, (D) including at said first work station valve opening means alignable with said valve means and with said vacuum connection means, (E) including at said first work station actuation means for simultaneously operating and opening said blow slot in each of said core rods of each said set, and (F) control means for sequencing (a) vacuumization of each said core rod of each said set at said first work station, (b) holding vacuum in each said core rod of each said set while such is at said second work station, (c) releasing, pressurizing and depressurizing each said core rod of each said set while such is at said third station and (d) separating a formed predetermined article from each said core rod of each said set while such is at said fourth station.

5. Apparatus for forming a hollow multilayered thermoplastic article comprising:

(A) a normally closed blow slot equipped core rod having a porous metal section incorporated into a forward outer surface portion thereof and having an internal fluid passageway longitudinally extending from a rear portion of said core rod to each of said blow slot and said porous metal section, (B) core rod transfer means including rotary means and stationary means for relatively moving said core rod between each one of a predetermined plurality of locations, (C) liner loading station means at a first one of said locations for placing a previously formed liner comprised of a thermoplastic material over said core rod, said liner having an internal surface configuration which is generally conformable with said outer surface portion, (D) pressure reducing means for producing a vacuum at said liner loading station, (E) injection mold station means for forming a parison over said liner loaded core rod to form a multilayered preform at a second one of said locations, (F) blow mold station means for blow molding said preform on said core rod to form a blown article at a third of said locations, (G) pressure producing means for producing gas pressure at said blow mold station means and operative means for opening and then closing said blow slot at said blow mold station, (H) blown article removal station means for removing said blown article from said core rod at a fourth of said locations, (I) control means for operating said core rod transfer means, said liner loading station means, said injection mold station means, said blow mold station means, and said blown article removal station means, (J) first detachable connection means at said liner loading station means for connecting said internal fluid passageway with said pressure reducing means, (K) second detachable connection means at said blow mold station means for connecting said internal fluid passageway with said pressure producing means, and (L) valve means for closing said internal fluid passageway (a) to maintain a vacuum in said liner loaded core rod when said internal fluid passageway is detached from said first detachable connection means, and also to depressurize said core rod in said blow mold station means after said blown article is formed before said second detachable connection means is discontinued, said valve means including valve operating means automatically functioning when said core rod transfer means has so moved said core rod into said liner loading station means and into said blow mold station means, respectively.

* * * * *